Figure 1:
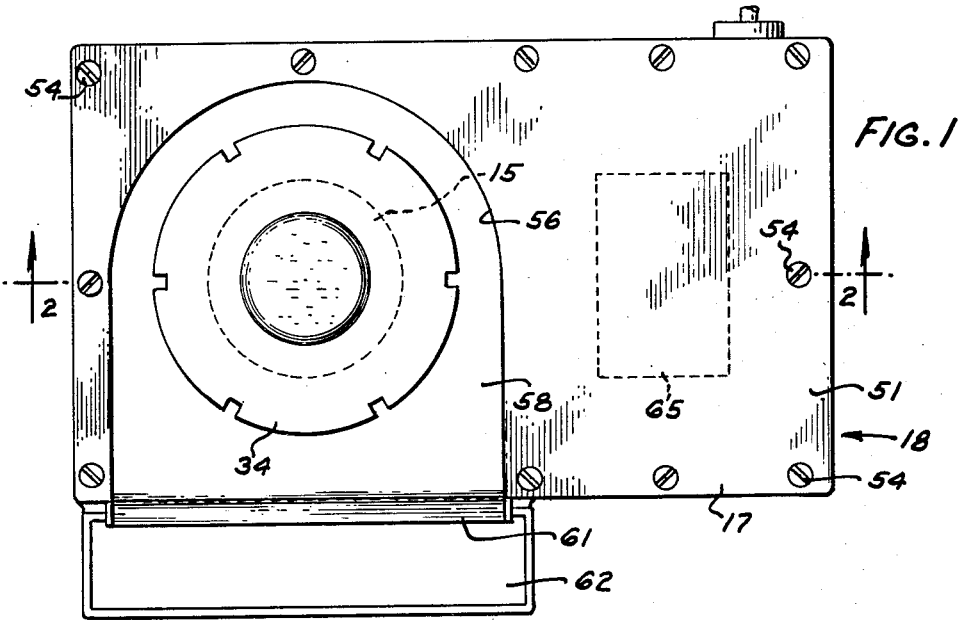

March 17, 1953 L. O. REICHELT 2,632,082
SOLDERING FIXTURE FOR FUSES
Filed July 5, 1951

INVENTOR
L. O. REICHELT
BY E. H. Kane
ATTORNEY

Patented Mar. 17, 1953

2,632,082

UNITED STATES PATENT OFFICE 2,632,082

SOLDERING FIXTURE FOR FUSES

Lester O. Reichelt, Chicago, Ill., assignor to Western Electric Company, Incorporated, New York, N. Y., a corporation of New York Application July 5, 1951, Serial No. 235,339

9 Claims. (Cl. 219—12)

This invention relates to a device for heating and supporting a pool of solder and more particularly to a soldering fixture for use in the soldering of fuse wires to the ends of tubular fuses.

In the manufacture of tubular fuses after the fuse wires have been assembled therein and bent over the ends thereof, a plurality of the fuses are grouped together and the ends thereof are dipped into a suitable flux and then into a meniscus of molten solder on a flat surface of a heated block of metal to solder the terminal ends of the fuses and the fuse wires together. Heretofore, according to one method practiced, the solder was placed on a flat surface of a heated rectangular block of copper having a threaded stud extending therefrom which was screwed into the threaded recess of a commercial type soldering iron heater after the tip thereof had been removed. The affinity of some of the metals in the solder causes the flat surface of copper supporting the solder to become pitted and unsuitable for continued use. It was necessary, therefore, to cut away the pitted surface at relatively frequent intervals as the pitting occurred with the result that after a limited period of use the copper block was reduced to a size where it was no longer serviceable and had to be replaced.

It is an object of the present invention to provide an efficient soldering fixture for use in soldering parts together.

It is a further object of the invention to provide a simple device for heating solder and for readily replacing the solder supporting surface thereon.

In accordance with one embodiment of the invention a cylindrical solder heating unit is provided having a substantially flat circular top surface on which a thin, replaceable, pre-tinned copper sheet or disk is clamped by a ring for supporting and heating a meniscus of solder into which the ends of groups of tubular fuses may be dipped to solder the fuse wires to the terminal ends thereof. A fixture in which the heating unit is supported has a depressed recess around the upper portion of the heating unit to form a trough for the reception of the waste material produced after continued soldering operations and has a flat heated surface onto which the ends of the fuses are pressed to flatten the solder as it hardens on the ends of the fuses after they are removed from the pool of solder. A thermocouple, mounted in the upper portion of the heating element beneath the replaceable disk, is connected to a control device for controlling the power applied to the heating unit to maintain the temperature thereof at a relatively constant value.

Figure 2:
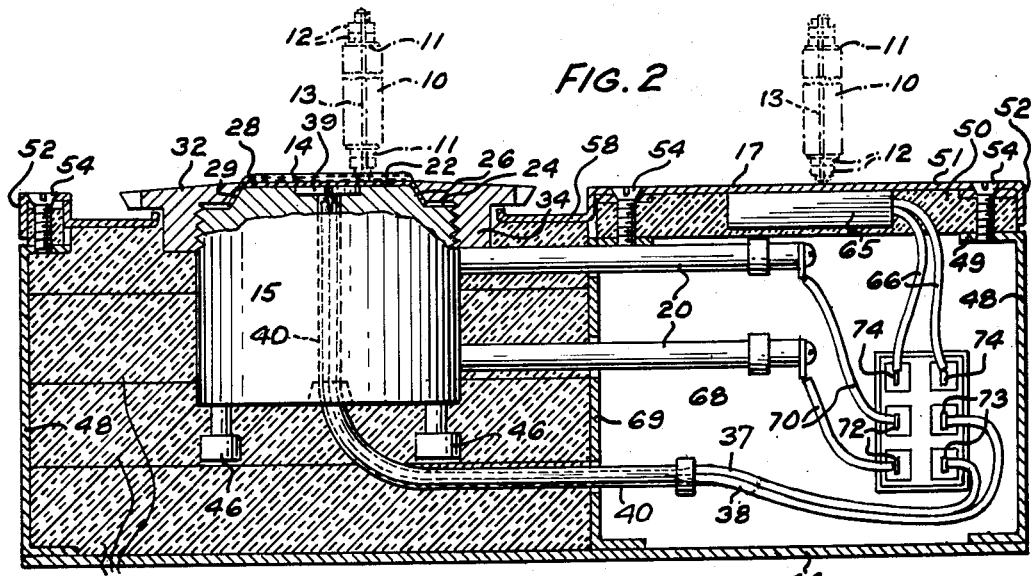
Figure 3:
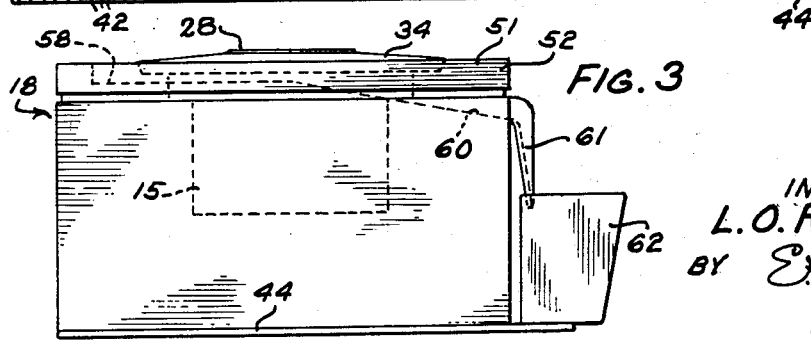

Other objects and advantages of the invention will become apparent by reference to the following detailed description thereof when considered in conjunction with the accompanying drawings illustrating a preferred embodiment thereof, in which Fig. 1 is a plan view of the soldering fixture;

Fig. 2 is a vertical longitudinal sectional view of the soldering fixture taken on the line 2—2 of Fig. 1; and Fig. 3 is a side elevational view of the soldering fixture.

The device illustrated herein was designed for heating and supporting a pool of solder for use in soldering fuse wires into the terminal ends of tubular fuses. The fuses, indicated in dotted lines in Fig. 2, are of the conventional tubular type, each having a tubular body 10 of insulating material on the ends of which are mounted threaded, apertured metal terminal ends 11 with pairs of lock nuts 12 thereon and having a length of fuse wire 13 extending through the fuse and bent around the ends of the terminal members 11. In the operation of soldering the ends of the fuse wire 13 to the terminals 11 a group of fuses 10 are picked up by the operator and the ends thereof are dipped in a suitable flux and then dipped into a meniscus of molten solder 14 supported on the upper surface of a heating unit 15 during which the bent end portions of the fuse wires 14 are melted off and the molten solder fills the space between the fuse wire 13 and the inner walls of the apertured terminal ends 11 after which the fuses are removed from the pool of molten solder and are immediately moved into engagement with a flat heated surface 17 of the soldering fixture 18 in which the heating unit 15 is mounted, to flatten and even off the solder which is now in a plastic condition on the ends of the fuses.

The heating unit 15 comprises a solid cylindrical cast metal member with a commercial type rod-like heating element, formed into a helical coil, cast therein. Ends 20 of the heating element extend outwardly from the heating unit 15. The upper portion of the heating unit 15 has a substantially flat, horizontal, circular surface 22 of less diameter than that of the body portion of the unit 15 and has an annular horizontal marginal surface 24 disposed at a lower level than the surface 22 and joined thereto by a tapering or conical surface 26. A thin, replaceable copper sheet or disk 28, having a conical-shaped peripheral flange 29 is pre-formed to conform to and engage the surfaces 22 and 26 of the heating unit 15. A clamping ring or annular plate 32, having a conical surface conforming to the shape of the conical flange 29 is adapted to clamp the flange 29 and the disk 28 in tight engagement with the upper surface of the heating element 15. The upper surface of the disks 28 are pre-tinned to facilitate the application of solder thereto to form the solder pool thereon.

Any suitable means for securing the clamping ring 32 to the heating unit 15 may be provided. As herein shown the ring 32 has a depending flange portion 34 which is internally threaded to engage external threads on the upper portion of the heating element for securing the clamping ring in clamping engagement with the heating element 15. The ring 32 is preferably made of stainless steel providing a surface which is smooth and to which the molten solder does not readily adhere, and the upper surface of the ring slopes downwardly slightly toward its outer periphery to facilitate the removal of scrap particles therefrom.

A thermo-couple formed from the elements 37 and 38 has its junction mounted in the disk 39 which is positioned in a central recess in the upper portion of the heating unit 15 and beneath the sheet 28. A tubular conduit 40 extends downwardly from the thermocouple disk 39 through the center of the heating unit 15 and the coiled heating element therein to provide a passageway for the elements 37 and 38. Because the thermo-couple disk 39 is in contact with the relatively thin sheet 28 and is directly below the pool of molten solder thereon it is effected by and is responsive to any variation in temperature of the pool of solder.

Layers of suitable heat insulating material 42 are mounted on the base plate 44 of the fixture 18 and are formed to receive and support the heating unit 15. Cap screws 46 may be used to anchor the heating unit 15 in place. Sheet metal walls 48 secured to the base plate 44 and extending upwardly from the border thereof have inwardly directed flanges 49 at their upper edges on which is supported a sheet of heat insulating material 50. A sheet of stainless steel 51 rests on the sheet 50 of insulating material and has downwardly extending flanges 52 engaging the side edges of the sheet 50. The sheets 50 and 51 are secured in position by a plurality of screws 54 which engage threaded apertures in the flange 49 of the walls 48. To provide an opening around the heating unit 15 and the clamping ring 32 the sheets 50 and 51 are cut out at 56 which cut-out extends inwardly from the forward edge of the fixture.

A sheet of metal 58 of predetermined outline conforming in part to the outline of the cut-out 56 and having a central aperture for receiving the heating unit 15 and the flange 34 of the clamping ring thereon, is positioned in the opening 56 at a lower level than that of the upper surface of the heater element 15 and the sheet 51 to form a pan or trough which has a downwardly sloping forward portion 60 (Fig. 3) and a downwardly extending lip portion 61 for directing the waste solder deposited thereon into a scrap solder bin or receptacle 62 supported on the base 44 beneath the lip 61 of the trough member 58.

In order to maintain the top sheet 51 and the flat surface 17 thereon at a predetermined elevated temperature, a thermostatically controlled hot plate heater 65 is mounted in contact with the underneath surface of the sheet 51 (Fig. 2). Leads 66 extend from the hot plate 65 into a chamber 68 of the fixture formed below the plate 50 in the right-hand portion of the fixture as viewed in Fig. 2. A wall or partition 69 extending upwardly from the base plate 44 serves to retain the insulating material 42 in position and also defines one boundary of the chamber 68. Conductor leads 70 from the heater element 20 of the heating unit 15 and the elements 37 and 38 of the thermo-couple are connected to suitable terminals 72 and 73, respectively, which are electrically connected by means of a plug and cord connector to a suitable control unit (not shown) which is operable in cooperation with and under control of the thermocouple for supplying a variable amount of electrical power to the heating unit 15 to maintain the heating unit and the pool of solder at a predetermined substantially uniform temperature. The leads 66 are connected to terminals 74 which in turn are connectible to a suitable source of electrical power to energize the heater 65.

In the operation of the device a supply of solder is applied to the sheet 28 of the heating unit 15 to form a meniscus of molten solder thereon. A group of fuses 10 may then be manipulated to dip the ends thereof into a flux and then into the molten solder on the heating unit and held there for a predetermined short interval of time after which the fuses are moved therefrom immediately onto the surface 17 of the fixture to push the plastic solder thereon as it congeals into the ends of the apertured terminals 11 to effect a good electrical connection between the fuse wires and the terminals. A suitable wax may be applied to surface 17 of the stainless steel sheet 51 to aid in preventing the solder on the ends of the fuses from adhering to the plate 51. As successive groups of fuses are processed in this manner, waste and scrap particles accumulate on the sheet 28, which scrap material may be removed from the sheet 28 with the aid of a straight edge scraping tool. The scrap is scraped from the heating unit or from the plate 51 into the guide trough 58 and is then directed into the scrap bin 62.

Because of the affinity of some of the metals in the solder for the copper, after continued use of the heater 15 and the sheet 28, the upper surface of the copper sheet 28 becomes pitted and interferes with the efficient and satisfactory soldering of other fuses, and necessitates the removal of the pitted surface and the provision of a smooth surface. With the present device in order to remove the pitted surface and provide a clean, smooth surface for further soldering operations it is merely necessary to remove the clamping ring 32 and the sheet 28 from the heating unit 15 and replace the old sheet 28 with a new one and clamp it securely in position on the heating unit 15. With a new sheet 28 securely clamped onto the heating unit 15 and heated thereby solder may readily be added onto the sheet to form a meniscus thereon preparatory to continuing the operation of soldering additional fuses.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A soldering fixture comprising a heating unit having a substantially flat heat conducting upper surface and surfaces extending downwardly from the edges thereof, a thin, replaceable, flat sheet of metal having transversely extending flanges on the edges thereof supported on and conforming to the upper and downwardly extending surfaces of said heating unit for supporting and heating a pool of solder thereon, and means for removably securing said sheet of metal onto the top of and in engagement with said heating unit.

2. A soldering fixture comprising a cast metal heating unit having a coiled electrical heating element cast therein connectible to a source of power, said heating unit having a substantially flat upper surface and peripheral surfaces sloping from the edges thereof, a thin sheet of metal having flat and sloping portions conforming to the upper surface of said heating unit removably supported on the upper end of said heating unit for supporting a meniscus of solder thereon, a clamping ring having sloping surfaces engageable with the sloping portions of said sheet and a top surface substantially flush with the top surface of said sheet, and means for securing the ring onto said heating unit to clamp said sheet against said heating unit.

3. A soldering fixture comprising a heating unit having a coiled electrical heating element therein connectible to a source of power, said heating unit having a substantially flat upper surface and peripheral surfaces sloping from the edges thereof, a thin sheet of metal having flat and sloping portions conforming to the upper surface of said heating unit removably supported on the upper end of said heating unit for supporting a pool of solder thereon, a clamping ring having sloping surfaces engageable with the sloping portions of said sheet and having a top surface substantially flush with the top surface of said sheet, means for securing the ring on said heating unit to clamp said plate against said heating unit, said heating unit having a central recess on the upper portion thereof and an aperture extending centrally therethrough from the upper portion thereof, a thermo-couple in the recess of the upper portion of said heating unit engageable with said sheet, leads from said thermo-couple passing through the central aperture in said heating unit connectible to a control unit for varying the power to said heating unit to maintain the temperature of said pool of solder at a predetermined substantially uniform temperature.

4. A soldering fixture comprising a cast metal block having a coiled electrical heating element cast therein connectible to a source of power for heating said block, said block having a substantially flat upper surface and peripheral surfaces sloping from the edges thereof, screw threads on the upper portion of said block, a thin sheet of metal having flat and sloping portions conforming to the upper surface of said block removably supported on the upper end of said block for supporting and heating a meniscus of solder thereon, a clamping ring having sloping surfaces engageable with the sloping portions of said sheet and having a top surface substantially flush with the top surface of said sheet, screw threads on said ring engageable with the threaded portion of said block for securing the ring thereon, said block having a central recess on the upper portion thereof and an aperture extending centrally therethrough from the upper portion, a thermo-couple in the recess of the upper portion of said heating unit engageable with said sheet, a tube extending from said thermo-couple through the central aperture in said block, leads from said thermo-couple passing through the tube connectible to a control unit for varying the power to said heating element to maintain the temperature of said pool of solder at a predetermined uniform temperature.

5. A soldering fixture for use in soldering fuse wires to the ends of tubular fuses and forming the soldered ends thereof comprising a base, a heating unit having a flat top surface for supporting and heating a pool of solder thereon and having an electrical heating element connectible to a source of electric power, a metal plate having a recess extending inwardly from one edge to receive said heating unit, means for supporting said heating unit and said metal plate on said base with the top surface thereof in substantial horizontal alignment and with said edge portion of the plate in spaced relation to the heating unit, electrical heating means for heating said plate, and a pan positioned between said heating unit and said plate and at a lower level than the upper surface thereof for receiving waste solder from the heating unit and the plate.

6. A soldering fixture for use in soldering fuse wires to the ends of tubular fuses and forming the soldered ends thereof comprising a base, a cast metal heating unit having a flat top surface and an electrical heating element cast therein connectible to a source of electric power, a thin, replaceable metal sheet supported on the top of said heating unit for holding and heating a pool of solder thereon, means removably securing said sheet onto the top of said heating unit, a metal plate having an edge portion shaped to conform to and receive a portion of said heating unit, means for supporting said heating unit and said metal plate on said base with the top surface thereof in substantial horizontal alignment and with said edge portion of the plate in spaced relation to the heating unit, electrical heating means for heating said plate, and a pan surrounding said heating unit and positioned between said heating unit and said plate and at a lower level than the surface thereof for receiving waste material from the heating unit and plate.

7. A soldering fixture for use in soldering fuse wires to the ends of tubular fuses and forming the soldered ends thereof comprising a base, a heating unit comprising a cast metal block having an electrical heating element cast therein with leads connectible to a source of electric power for heating said block, said block having a substantially flat upper surface and peripheral surfaces sloping from the edges thereof, a thin sheet of metal having flat and sloping portions conforming to the upper surface of said block removably supported on the upper end thereof for heating and supporting a meniscus of solder thereon, a clamping ring having sloping surfaces engageable with the sloping portions of said sheet and a top surface substantially flush with the top surface of said sheet, means for securing the ring onto said block to clamp said sheet against said block, a metal plate having a recess extending inwardly from one edge for receiving said heating unit, means for supporting said heating unit and said metal plate on said base with the top surface thereof in substantial horizontal alignment and with said edge portion of the plate in spaced relation and adjacent to the heating unit, electrical heating means for heating said plate, means forming a trough surrounding the heating unit positioned between said heating unit and said plate and at a lower lever than the surface thereof for receiving waste material from the heating unit and the plate and for guiding said waste material for lateral movement from said fixture.

8. A soldering fixture for use in soldering fuse wires to the ends of tubular fuses and forming the soldered ends thereof comprising a base, a heating unit comprising a cast metal block having an electrical heating element cast therein with leads connectible to a source of electric power for heating said block, said block having a substantially flat upper surface and peripheral surfaces sloping from the edges thereof, a thin sheet of metal having flat and sloping portions conforming to the upper surface of said block removably supported on the upper end thereof for heating and supporting a pool of solder thereon, a clamping ring having sloping surfaces engageable with the sloping portions of said sheet and a top surface substantially flush with the top surface of said sheet, means for securing the ring on said block to clamp said sheet against said block, said block having a central recess on the upper portion thereof and an aperture extending centrally therethrough from the upper portion thereof, a thermo-couple in the recess of the upper portion of said heating unit engageable with said sheet, leads from said thermo-couple passing through the central aperture in said heating unit connectible to a control unit for varying the power to said heating unit to maintain the temperature of said pool of solder at a predetermined substantially uniform temperature, a metal plate having a recess extending inwardly from one edge for receiving said heating unit, means for supporting said heating unit and said metal plate on said base with the top surface of said heating unit and said plate in substantial horizontal alignment and with said edge portion of the plate in spaced relation and adjacent to the heating unit, electrical heating means for heating said plate, means forming a trough surrounding the heating unit and positioned between said heating unit and said plate and at a lower level than the surface thereof for receiving waste material from the heating unit and the plate and for guiding said waste material for lateral movement from said fixture.

9. In a soldering fixture, the combination of a heating unit having a substantially flat heat conducting upper surface, a thin replaceable flat sheet of metal supported on said upper surface of the heating unit for supporting and heating a pool of solder thereon, and means for removably securing said sheet of metal onto the top of and in engagement with said heating unit.

LESTER O. REICHELT.

REFERENCES CITED

The following references are of record in the file of this patent:

UNITED STATES PATENTS

| Number | Name | Date |
|---|---|---|
| 485,017 | Ries | Oct. 25, 1892 |
| 2,462,148 | Ward | Feb. 22, 1949 |